(12) United States Patent
Jacobsson

(10) Patent No.: US 7,753,142 B2
(45) Date of Patent: Jul. 13, 2010

(54) DRILLING UNIT

(75) Inventor: Henrik Jacobsson, Vretstorp (SE)

(73) Assignee: Atlas Copco Rock Drills AB, Orebro (SE)

( * ) Notice: Subject to any disclaimer, the term of this patent is extended or adjusted under 35 U.S.C. 154(b) by 506 days.

(21) Appl. No.: 11/663,409

(22) PCT Filed: Oct. 20, 2005

(86) PCT No.: PCT/SE2005/001565

§ 371 (c)(1),
(2), (4) Date: Mar. 21, 2007

(87) PCT Pub. No.: WO2006/046906

PCT Pub. Date: May 4, 2006

(65) Prior Publication Data

US 2008/0142235 A1 Jun. 19, 2008

(30) Foreign Application Priority Data

Oct. 27, 2004 (SE) .................................... 0402594

(51) Int. Cl.
*E21B 7/02* (2006.01)
(52) U.S. Cl. ........................... 175/162; 173/27; D15/30
(58) Field of Classification Search ................. 175/122; D15/21, 30; 173/27, 25, 184; 180/68.4, 180/68.1, 68.3, 69.24; 123/41.7; 296/24.4, 296/24.41
See application file for complete search history.

(56) References Cited

U.S. PATENT DOCUMENTS

| 1,139,275 | A | * | 5/1915 | Gudmond-Hoyer | 173/25 |
| 1,735,091 | A | * | 11/1929 | Powers et al. | 173/75 |
| 3,788,418 | A | | 1/1974 | Clancy et al. | |
| 3,810,383 | A | * | 5/1974 | Matherne | 73/40.5 R |
| 4,192,393 | A | * | 3/1980 | Womack et al. | 175/103 |
| 4,226,217 | A | | 10/1980 | Haslbeck et al. | |
| 4,241,702 | A | | 12/1980 | Takeuchi et al. | |
| 4,339,014 | A | * | 7/1982 | Berth et al. | 180/68.1 |
| 4,454,926 | A | * | 6/1984 | Akins | 180/68.1 |
| 4,995,447 | A | | 2/1991 | Weidmann et al. | |
| 5,692,467 | A | | 12/1997 | Sahm et al. | |
| 6,662,892 | B2 | * | 12/2003 | Falk et al. | 180/68.1 |
| 2003/0066209 | A1 | * | 4/2003 | Takezaki et al. | 37/197 |

* cited by examiner

Primary Examiner—Kenneth Thompson
(74) Attorney, Agent, or Firm—Mark P. Stone

(57) ABSTRACT

A drilling unit, comprising a chassis (3, 4) and a drilling machine (1, 2) arranged in front of the same, the chassis encasing an engine-house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) extends transverse to the longitudinal direction of the chassis and divides the engine house (8) into a front part (18) and a rear part (19). The first part (18) of the engine house (8) forms the front part and the second part (19) of the engine house (8) forms the rear part.

19 Claims, 3 Drawing Sheets

DRILLING UNIT

The present application is the United States National Phase of International Patent Application PCT/SE2005/001565, and claims priority from corresponding Swedish Patent Application No. 0402594-6, filed Oct. 27, 2004, pursuant to 35 USC Section 119(a).

TECHNICAL FIELD

The present application relates to a drilling unit, comprising a chassis that encases an engine house, in which an engine is arranged as well as at least one cooler and at least one fan.

Preferably, the drilling unit is a rock-drilling unit, suitably for use above ground.

BACKGROUND OF THE INVENTION

A conventional drilling unit, also denominated drilling rig by those skilled in the art, for use above ground and according to prior art comprises a carrier and a feeder having a drilling machine. The carrier frequently includes a chassis, which defines an engine house, which in turn accommodates an engine and a plurality of great power consumers, for example a compressor. Furthermore, the engine house accommodates one or more coolers having fans associated therewith. The coolers may include an engine cooler, a charge-air cooler, a hydraulic-oil cooler and a compressor cooler.

The fan(s) either sucks air from the engine house and presses it or sucks the air out through the cooler, depending of how the fan is located in relation to the cooler, upstream or downstream. Alternatively, the fan sucks or presses air from the surroundings through the cooler and further through the engine house. This means that either the cooler has been fed with air that has been warmed up in the engine house, by heat exchange with the engine, the compressor, etc., or air that has been warmed up during the passage of the cooler has been brought into the engine house.

Furthermore, a drilling unit creates much dust in the environment thereof because of rock being crushed in the operation. This dust is deposited everywhere on the machine in spite of equipment in the form of vacuum cleaner is onboard in order to take care of it. The typical dust handling equipment collects the dust and puts it in piles. However, these may whirl up when affected by, for example, wind or because of a vehicle driving through them. Dust is sucked up by the fan or fans of the drilling unit and is pressed or drawn through the engine house, in particular if the air is sucked up near the ground.

THE OBJECT OF THE INVENTION

An object of the present invention is to provide a drilling unit of the kind mentioned by way of introduction, having more efficient cooling than the corresponding drilling units according to prior art.

An additional object is to provide a drilling unit of the kind mentioned by way of introduction, in particular the engine of which, and possibly also certain other components in the engine house, thanks to the construction of the unit, are less exposed to contamination or deposit of dust than those of the corresponding drilling units according to prior art.

SUMMARY OF THE INVENTION

The object of the invention is solved by the drilling unit defined by way of introduction, which is characterized in that it comprises at least one partition wall that divides the engine house into a first part, which accommodates the engine, and a second part, which accommodates said cooler and fan.

Thanks to this construction, it is possible to prevent at least a substantial part of the air that passes through the fan(s) and the appurtenant coolers from also passing through the part of the engine house, the first part, where the engine is situated. The partition wall does not have to be completely air-proof for providing a certain effect of this kind. Thus, it may be just only partly air-proof. However, according to a preferred embodiment, it is completely air-proof, i.e., completely air impermeable. The part of an engine house that is not flowed through by cooling air may furthermore be sound-insulated in a simpler way. It is not necessary to use sound traps in the inlet or outlet for cooling air since the same do not have connection to the part of the engine house that accommodates the proper engine.

It is also possible to allow that a part of the air passes past the partition wall at a possible gap between the same and the surrounding wall of the chassis. However, according to an additional preferred embodiment, the partition wall abuts closely against the chassis along the inner circumference thereof.

In combination with the wall in itself being air-proof, the latter feature means that the partition wall forms a substantially air-proof bulkhead between the first and second parts of the engine house, which is preferable.

According to a preferred embodiment, the partition wall extends transverse to the longitudinal direction of the chassis and divides the engine house into a front part and a rear part. This is advantageous for a plurality of reasons, foremost maybe for the reason that it is more advantageous to build the carrier, which comprises the chassis and the components accommodated in the same, lengthwise than breadthwise or heightwise, in view of weight distribution and a pure practical need for not having too wide a unit. In other words, it is advantageous to build the carrier lengthwise, with the cooler and the fan either in front of or behind the engine.

According to an additional preferred embodiment, the first part of the engine house forms the front part and the second part of the engine house forms the rear part. Frequently, the unit has a cab in the front end of the chassis. If the coolers are placed adjacent to the same, this result in the cab being warmed up by the flow of warm air from these, which most often is not desirable. It may also be of advantage to let the coolers with the appurtenant fans be placed as far away from the direct dust source as possible. The latter is formed by the proper drilling machine, which normally is arranged in front of the carrier or the chassis.

According to a preferred embodiment, the chassis in the part that encases the second part of the engine house is provided with at least one air inlet opening. This is advantageously arranged in at least some one of the side walls or roof of the chassis. According to a preferred embodiment, it is arranged both in the side walls and the roof. It does not have to be continuous, but may be formed by a number of discrete openings, such as in a grating.

Preferably, the drilling unit comprises means for the ventilation of the first part of the engine house. The need for this is a direct consequence of the fact that the fan or the fans, in contrast to prior art, do not draw or press air through the part of the engine house in which the engine is located.

Advantageously, said means comprises an exhaust-gas-driven ejector. As an alternative or supplement to such an ejector, said means may comprise a fan, which then may have substantially smaller dimension and power than the fans or fans that are arranged adjacent to the coolers.

Additional features and advantages of the present invention will be seen in the following detailed description.

BRIEF DESCRIPTION OF THE DRAWINGS

Hereinafter, a preferred embodiment of the invention will be described closer with an exemplifying purpose, reference being made to the accompanying drawings, in which.

DETAILED DESCRIPTION OF THE INVENTION

Figure 1:
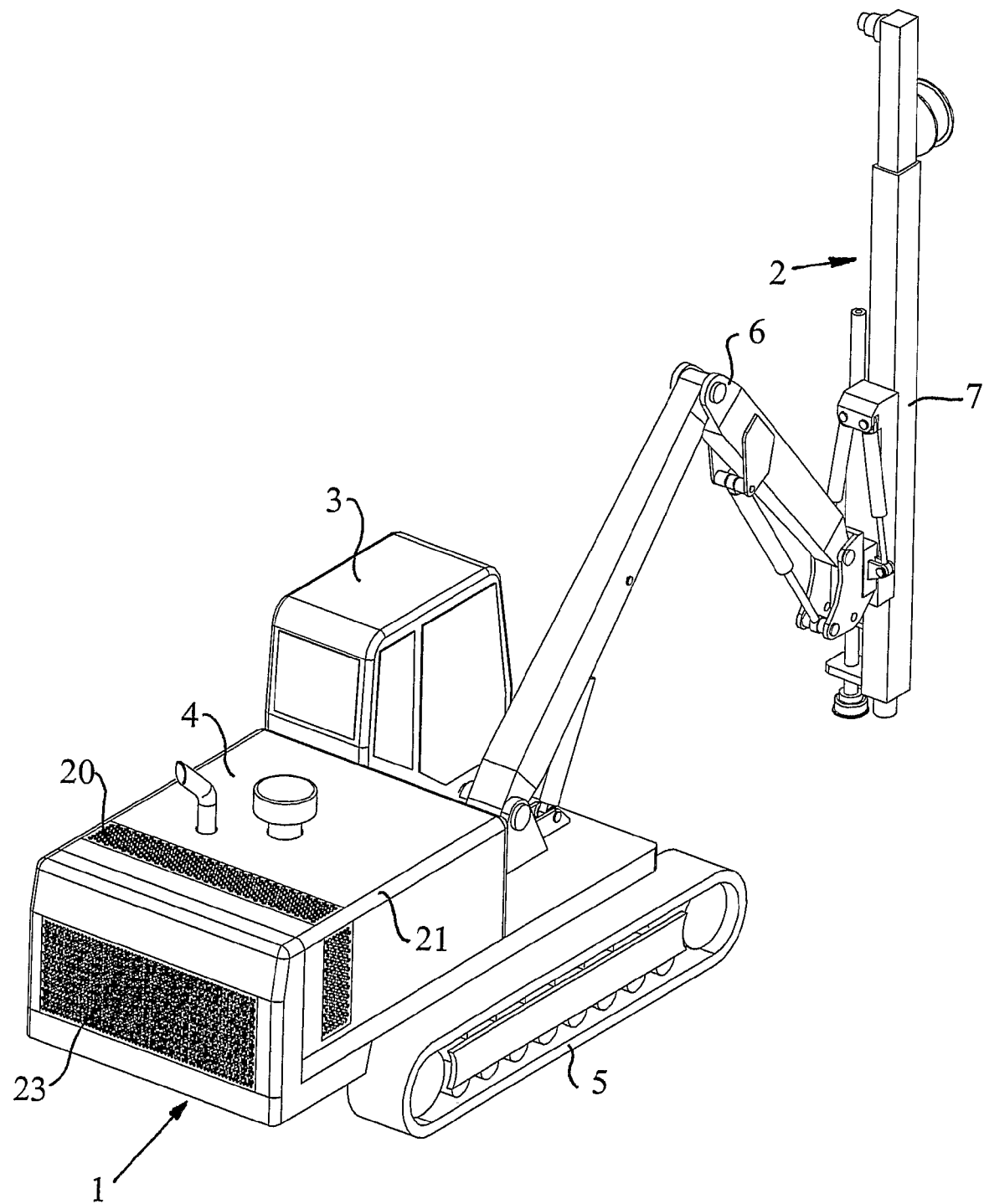
FIG. 1 is a schematic perspective view of a drilling unit according to an embodiment example of the invention.

According to an embodiment example of the invention, which is shown in FIG. 1, the drilling unit according to the invention comprises, in a known way per se, a carrier 1 and a feeder 2. The carrier 1 comprises a chassis, which includes a driver's cab 3 and an engine bonnet 4. Furthermore, the carrier 1 is provided with caterpillars 5 for the propulsion of the drilling unit.

The feeder 2 is connected to the carrier via bars 6 and carries by itself a drilling equipment 7.

Figure 2:
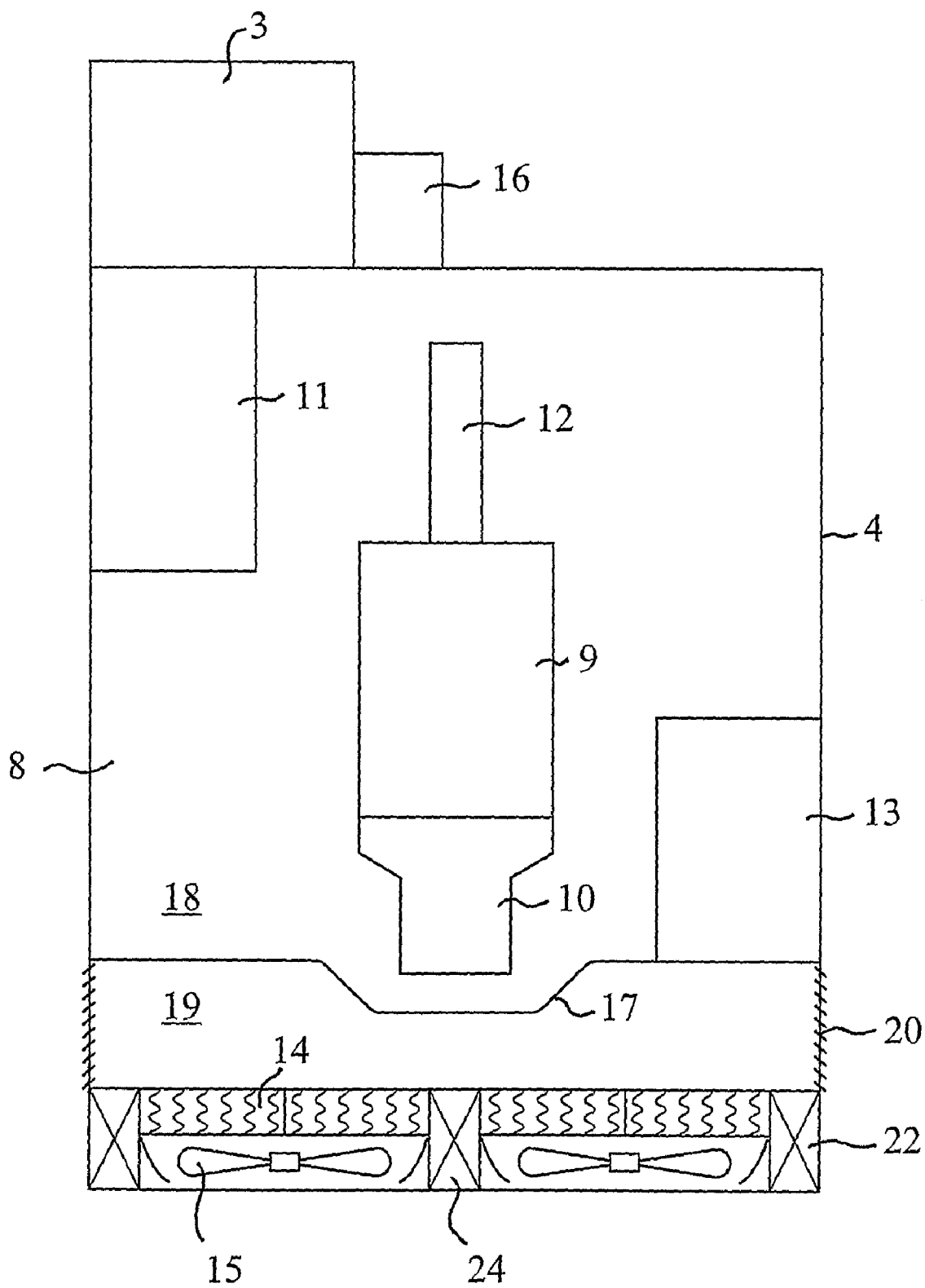
FIG. 2 is a schematic, partly cut picture from above of the engine house of a drilling unit according to a first embodiment of the invention, and FIG. 3 a schematic, partly cut picture from above of the engine house of a drilling unit according to a second embodiment of the invention.
Figure 3:
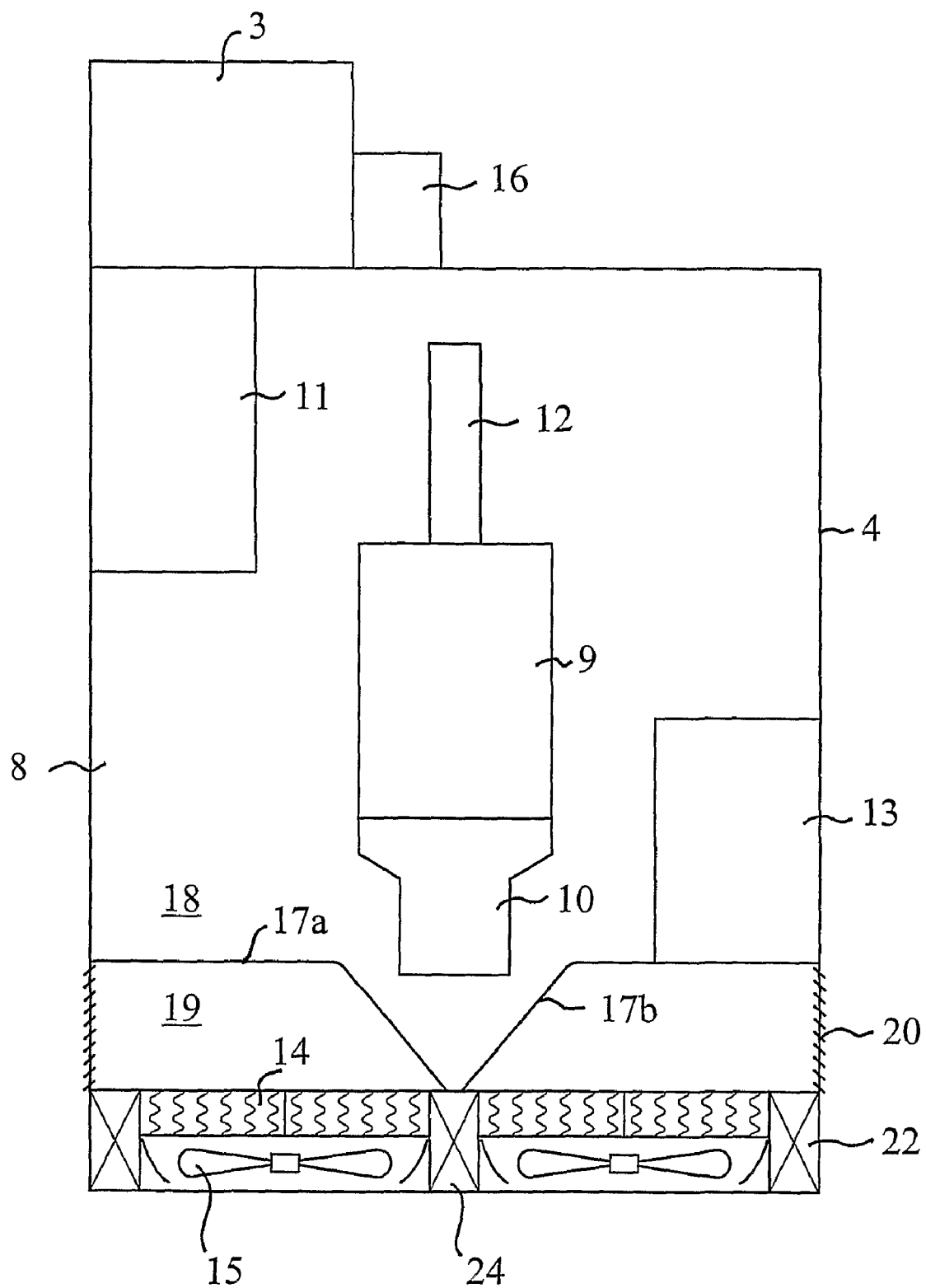

The engine bonnet 4 encases an engine house 8, which is not visible in FIG. 1, but in FIGS. 2 and 3. The engine house 8 accommodates, among other things, an engine 9, here centrally longitudinally mounted, a compressor 10 arranged behind and adjacent to the engine, a hydraulic-oil tank 11, a hydraulic-oil pump 12, a vacuum cleaner 13, one or, such as here, a plurality of coolers 14, as well as one or, such as here, a plurality of fans 15 cooperating with the coolers. A control unit, for example the engine control computer, 16 is also included and is, as well as other components, schematically represented in FIGS. 2 and 3. It may be located on another location than what is shown, for example on the proper engine. It should be appreciated that the engine house 8 also accommodates a number of other components, such as is customary in drilling units of this type, for example large air filters as well as a pressure vessel in which oil is separated from the compressor air, which however for the sake of simplicity are not represented in the drawings. Preferably, the engine 9 is an internal combustion engine, suitably a diesel engine. The coolers may include an engine water cooler, a charge-air cooler, a hydraulic-oil cooler and a compressor-oil cooler, and are consequently arranged in heat-exchanging relation to the corresponding components, and are consequently arranged so that the corresponding medium, water, charge air, oil, should be able to circulate in the cooler and be cooled by the cooling air driven by the fans 15.

A partition wall 17 divides the engine house 8 into a first, front part 18 and a second, rear part 19. The second part 19 accommodates the coolers 14 and the fans 15, while the first part 18 accommodates the engine 9 as well as the remaining ones of the components that were mentioned above. The partition wall or diaphragm 17 is in itself air-proof. The outer periphery thereof extends sealingly along the inner periphery of the engine bonnet 4, so that an air-proof bulkhead is formed between the first and second parts 18, 19 of the engine house 8. The partition wall may be made from metal, plastic or some suitable compound material. In the shown embodiment examples, it lies in close contact with the vacuum cleaner 13 located on one side of the chassis.

The fans 15 are, in the shown embodiment examples, arranged behind the coolers 14 as seen in the longitudinal direction of the chassis. They are arranged to suck air through the coolers 14 for cooling the latter. It should be appreciated that they alternatively, for instance, could be arranged to blow air through the coolers 14, or be placed in front of the coolers 14. However, the positioning shown is preferable from a plurality of aspects. On one hand the heating of the partition wall 17 is minimized, and on the other hand, it is from a pure fluid mechanical point of view advantageous to suck the air through the coolers 14.

The part of the engine bonnet 4 that surrounds the second part 19 of the engine house 8 is provided with at least one air inlet opening 20. In the preferred examples shown in FIGS. 1-3, the air inlet opening 20 extends transversely across the engine bonnet 4. In other words, the air inlet opening 20 is arranged in both side walls of the engine bonnet and in the roof thereof. It is practically continuous, apart from where supporting beams, such as the upper horizontal side beam 21 indicated in FIG. 1, intersect it. The opening 20 is covered by a grating. The opening 20 has a width that substantially corresponds to the width of the part of the second part 19 of the engine house 8 that extends between the partition wall 17 and the pack that comprises the coolers 14 and the fans 15, no matter how the latter ones are mutually placed. In that connection, the opening 20 extends from the partition wall 17 to a rear vertical, supporting beam 22 in each one of the rear corners of the chassis. In such a way, it is guaranteed that a large flow of air can enter into the second part 19 of the engine house 8 and be brought to flow through the coolers 14, when the fans 15 are in operation. The engine bonnet 4, or the chassis, is further provided with one or more air outlet openings 23 in the rear wall thereof, facing the fans 15.

At the bottom of the second part 19 of the engine house 8, the chassis is substantially air-proofly formed in order to prevent air having a great content of dust from being sucked up by the fans 15.

In FIG. 3, an alternative embodiment of the partition wall 17 is shown, the second part 18 of the chamber 8 being divided into two parts by two walls 17a, 17b, each one of which extends from a respective side wall of the engine bonnet 4 and turns rearward and is connected to a central, vertical supporting beam 24 in the rear edge of the chassis. The beam 24 may be telescopic and arranged to be extended downward toward the ground in order to form an additional support leg for the drilling unit in operation. It is located between the two pairs of coolers 14 and fans that are shown in the preferred embodiment examples. In such a way, the second part 19 of the engine house 8 is divided into two additional parts, which may be of advantage since the cooling demands and thereby the fan-power demands may be different for the respective pairs of coolers 14 and fans 15 on opposite sides of the central, vertical, supporting beam 24. Of course, other ways to divide the second part 19 of the chamber 8 than the one that has been proposed here are also feasible. By the fact that the walls 17a, 17b are bent rearward in the direction of the centre line of the engine house, they leave room in the middle for the compressor 10, which also is centrally placed. In such a way, the space below the engine bonnet 4 can be utilized optimally.

The coolers that are adjacent the beam 24 are substantially closely abutting against the same for the avoidance of cooling losses because of the fact that a part of the air that is sucked through the fans 15 does not pass the coolers 14. Correspondingly and for the same reason, the coolers 14, here the outer ones of these, are closely arranged against the chassis part situated closest against these, in this case the rear vertical beams 22 placed in the corners. The division of the engine house 8 into a first part 18 and a second part 19 results in a substantially smaller quantity of air flowing through the first part 18 of the engine house 8 than what otherwise would have been the case. In order to get a sufficient throughput of air through this space, it may therefore be appropriate to install means for the ventilation of the first part 18 of the engine house 8. Such means may comprise an exhaust-gas-driven ejector or a separate smaller fan arranged in the first part of the engine house 8, or adjacent to the same. Naturally, it would also be feasible with solutions where the partition wall 17 does not form a completely air-proof bulkhead, but a part of the air is allowed to pass via the same, in order to, in such a way, still contribute to a certain ventilation of the first part 18 of the engine house 8.

It should be appreciated that the chassis 4 in the first part 18 of the engine house 8, in which a substantially smaller flow of air can be expected than in the second part 19, can be allowed to have a partly open bottom, as well as that additional air-ventilation openings, for example adjacent to a smaller fan arranged therein, conceivable could be present in the part of the engine bonnet 4 that surrounds the first part 18 of the engine house 8.

The invention claimed is:

1. Drilling unit, comprising a chassis (3, 4) and a drilling machine (1, 2) arranged in front of the chassis, the chassis encasing an engine house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) divides the engine house (8) into a front part (18) and a rear part (19), wherein the first part (18) of the engine house (8) forms the front part and the second part (19) of the engine house (8) forms the rear part, and the partition wall (17) is at least partly air-proof.

2. Drilling unit according to claim 1, characterized in that the partition wall (17) is completely air-proof.

3. Drilling unit according to claim 1, characterized in that the partition wall (17) forms a substantially air-proof bulkhead between the first and second parts (18, 19) of the engine house (8).

4. Drilling unit according to claim 1, characterized in that the partition wall (17) abuts closely against the chassis along an inner periphery thereof.

5. Drilling unit according to claim 1, characterized in that the chassis (3, 4) in the part that encases the second part (19) of the engine house (8) is provided with at least one air inlet opening (20).

6. Drilling unit, comprising a chassis (3, 4) and a drilling machine (1, 2) arranged in front of the chassis, the chassis encasing an engine house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) divides the engine house (8) into a front part (18) and a rear part (19), wherein the first part (18) of the engine house (8) forms the front part and the second part (19) of the engine house (8) forms the rear part, and the partition wall (17) is completely air-proof.

7. Drilling unit according to claim 6, characterized in that the partition wall (17) forms a substantially air-proof bulkhead between the first and second parts (18, 19) of the engine house (8).

8. Drilling unit according to claim 6, characterized in that the partition wall (17) abuts closely against the chassis along an inner periphery thereof.

9. Drilling unit according to claim 6, characterized in that the chassis (3, 4) in the part that encases the second part (19) of the engine house (8) is provided with at least one air inlet opening (20).

10. Drilling unit, comprising a chassis (3, 4) and a drilling machine (1, 2) arranged in front of the chassis, the chassis encasing an engine house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) divides the engine house (8) into a front part (18) and a rear part (19), wherein the first part (18) of the engine house (8) forms the front part and the second part (19) of the engine house (8) forms the rear part, and the partition wall (17) forms a substantially air-proof bulkhead between the first and second parts (18, 19) of the engine house (8).

11. Drilling unit according to claim 10, characterized in that the partition wall (17) abuts closely against the chassis along an inner periphery thereof.

12. Drilling unit, comprising a chassis (3, 4) and a drilling machine (1, 2) arranged in front of the chassis, the chassis encasing an engine house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) divides the engine house (8) into a front part (18) and a rear part (19), wherein the first part (18) of the engine house (8) forms the front part and the second part (19) of the engine house (8) forms the rear part, and the partition wall (17) abuts closely against the chassis along an inner periphery thereof.

13. Drilling unit, comprising a chassis (3, 4) and a drilling machine (1, 2) arranged in front of the chassis, the chassis encasing an engine house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) divides the engine house (8) into a front part (18) and a rear part (19), wherein the first part (18) of the engine house (8) forms the front part and the second part (19) of the engine house (8) forms the rear part, and the chassis (3, 4) in the part that encases the second part (19) of the engine house (8) is provided with at least one air inlet opening (20).

14. Drilling unit according to claim 13, characterized in that said at least one air inlet opening (20) is arranged in at least one side wall or roof of the chassis 15. Drilling unit according to claim 14, characterized in that said air inlet opening (20) is arranged both in said at least one side wall and the roof.

16. Drilling unit, comprising a chassis (3, 4) and a drilling machine (1, 2) arranged in front of the chassis, the chassis encasing an engine house (8), in which an engine (9) is arranged as well as at least one cooler (14) and at least one fan (15), the drilling unit comprising at least one partition wall (17) that divides the engine house (8) into a first part (18), which accommodates the engine (9), and a second part, which accommodates said cooler (14) and fan (15), and that the partition wall (17) divides the engine house (8) into a front part (18) and a rear part (19), wherein the first part (18) of the engine house (8) forms the front part and the second part (19) of the engine house (8) forms the rear part, said drilling unit further comprising means for ventilating the first part of the engine house.

17. Drilling unit according to claim 16, characterized in that said means comprises an exhaust-gas-driven-ejector.

18. Drilling unit according to claim 16, characterized in that said means comprises a fan.

19. Drilling unit according to claim 17, characterized in that said means comprises a fan.

* * * * *